US005516740A

United States Patent [19]
Cody et al.

[11] Patent Number: 5,516,740
[45] Date of Patent: *May 14, 1996

[54] CATALYST COMPRISING THIN SHELL OF CATALYTICALLY ACTIVE MATERIAL BONDED ONTO AN INERT CORE

[75] Inventors: Ian A. Cody, Clearwater; Mahmoud M. Hafez, Bright's Grove; David N. Zinkie, Sarnia, all of Canada

[73] Assignee: Exxon Research and Engineering Company, Florham Park, N.J.

[*] Notice: the term of this patent shall not extend beyond the expiration date of Pat. No. 5,200,382.

[21] Appl. No.: 37,799

[22] Filed: Mar. 25, 1993

Related U.S. Application Data

[63] Continuation of Ser. No. 792,544, Nov. 15, 1991, Pat. No. 5,200,382.
[51] Int. Cl.$^6$ ............................ B01J 21/04; B01J 21/16; B01J 23/38
[52] U.S. Cl. ..................... 502/204; 502/202; 502/230; 502/207; 502/208; 502/210; 502/213; 502/216; 502/219; 502/223; 502/224; 502/332; 502/333
[58] Field of Search ..................... 502/230, 202, 502/204, 207, 208, 210, 213, 216, 219, 223, 323, 324, 332, 333, 527

[56] References Cited

U.S. PATENT DOCUMENTS

2,507,496  5/1950  Bond ........................ 252/455

(List continued on next page.)

FOREIGN PATENT DOCUMENTS

| 0039996 | 11/1981 | European Pat. Off. ......... B01J 21/00 |
| 025817 | 11/1982 | European Pat. Off. .......... C01F 7/20 |
| 0075314 | 3/1983 | European Pat. Off. ......... B01J 23/74 |
| 0221405 | 5/1987 | European Pat. Off. ....... C01B 33/193 |
| 2250296 | 5/1975 | France ........................... B05D 5/00 |
| 3644377 | 7/1988 | Germany ..................... B01D 53/36 |

| 1066294 | 6/1976 | Japan ................... B01J 21/04 |
| 56-12637 | 9/1981 | Japan ................... B01J 21/04 |
| 1278352 | 12/1986 | Japan ................... B01D 53/36 |
| 3020028 | 1/1988 | Japan ................... B01D 53/36 |
| 3084636 | 4/1988 | Japan ................... B01D 53/36 |
| 3143939 | 6/1988 | Japan ................... B01D 53/36 |

(List continued on next page.)

OTHER PUBLICATIONS

"Catalyst Supports and Supported Catalysts—Theoretical and Applied Concepts" Stiles (Editor) Butterworths, London, 1987, pll, 13–15, 46, 93.
"Fibrillar Alumina as a Wash–Coat on Monoliths in the Catalytic Oxidation of Xylene", Evaldsson, et al, Applied Catalysis, 55 (1989) 123–136.
"Effect of Hydrothermal Treatment on Alumina as Support for Noble Metal Catalysts" Rowendahl, et al Applied Catalysis 59 (1990) 89–102.
"Preparation of Highly Selective and Abrasion Resistant Thick Shell Catalysts for Heterogenously Catalyzed Exothermic–Oxidation Reaction" Arntz et al, Preparation of Catalysts IV, Elsevier Science Publishers pp. 137–149(1987).
"Theory of Preparation of Supported Catalysts" Nelmark et al, Ind. Eng. Chem. Prod. Res. Dev. 1981, 20 439–450.

*Primary Examiner*—Asok Pal
*Assistant Examiner*—Bekir L. Yildirim
*Attorney, Agent, or Firm*—Joseph J. Allocca

[57] ABSTRACT

A catalyst is disclosed comprising a thin outer shell of catalytic material bonded to an inner core of catalytically inert material. The catalyst is made by coating a catalytically inert core such as alpha alumina, with a thin layer of finely divided catalytically active material in a slurry of colloidal boehmite/pseudo boehmite then calcining to convert the boehmite/pseudo boehmite into γ alumina thereby bonding it to the inert core. Catalysts made by this technique containing an outer shell of platinum on fluorided alumina in an inert core of alpha alumina γ are attractive isomerization catalysts.

9 Claims, 2 Drawing Sheets

U.S. PATENT DOCUMENTS

| | | | |
|---|---|---|---|
| 4,077,912 | 3/1978 | Dolhyj et al. | 502/210 |
| 4,255,253 | 3/1981 | Herrington et al. | 208/216 |
| 4,428,864 | 1/1984 | Cairms et al. | 502/151 |
| 4,465,789 | 8/1984 | Lindsley | 502/255 |
| 4,495,308 | 1/1985 | Gibson | 502/355 |
| 4,888,320 | 12/1989 | Ihara et al. | 502/304 |
| 4,900,707 | 2/1990 | Cody et al. | 502/230 |
| 4,906,601 | 3/1990 | Cody et al. | 502/230 |
| 4,919,786 | 4/1990 | Hamner et al. | 502/230 |
| 4,923,588 | 5/1990 | Cody et al. | 208/27 |
| 4,923,841 | 5/1990 | Hamner et al. | 502/230 |
| 4,992,159 | 2/1991 | Cody et al. | 208/89 |
| 5,021,388 | 6/1991 | Fridey et al. | 502/261 |
| 5,075,275 | 12/1991 | Murahami | 502/303 |
| 5,200,382 | 4/1993 | Cody et al. | 502/204 |

FOREIGN PATENT DOCUMENTS

| | | | |
|---|---|---|---|
| 3162047 | 7/1988 | Japan | B01J 23/40 |
| 1115458 | 5/1989 | Japan | B01J 37/02 |
| 1307455 | 12/1989 | Japan | B01D 53/36 |
| 3202154 | 9/1991 | Japan | B01D 53/36 |
| 4161248 | 6/1992 | Japan | B01J 23/56 |
| 5184924 | 7/1993 | Japan | B01J 23/40 |
| 2104405 | 3/1983 | United Kingdom | B01J 23/89 |

CATALYST COMPRISING THIN SHELL OF CATALYTICALLY ACTIVE MATERIAL BONDED ONTO AN INERT CORE

CROSS-REFERENCE TO RELATED APPLICATIONS

This application is a continuation of U.S. Ser. No. 792,544, filed Nov. 15, 1991, and now U.S. Pat. No. 5,200,382.

BACKGROUND OF THE INVENTION

1. Field of the Invention

The present invention relates to a catalyst comprising a thin annular shell of catalytically active material deposited on and bonded to an inert, non catalytically active core. The catalyst can be made by depositing a thin coating of finely divided catalytically active material suspended in a colloidal dispersion of boehmite/pseudo boehmite in solvent on a particle of inert material having surface active sites e.g., alpha alumina, and calcining to convert the boehmite into gamma alumina containing the finely divided catalytically active material suspended in it, thereby bonding the annular layer and its contents to the inert e.g., alpha alumina core. Alternatively, a thin layer of colloidal boehmite/pseudo boehmite alone can be deposited on the core and calcined to convert it into gamma alumina which is subsequently loaded with catalytically active metal and, if desired, activity enhancers such as phosphorous, halogen and boron, and mixtures thereof.

2. Description of the Related Art

Platinum on fluorided alumina are known to be effective catalysts for the isomerization of waxes and for upgrading distillates and raffinates. The most selective catalysts for the conversion of wax into isomerate oil contains fluoride in the range 0.1 to less than 2 wt.% and employs small size particles of less than 1/16 inch diameter.

There is an incentive, therefore, to make low fluoride catalyst in particles smaller than 1/16 inch diameter but resort to particles of much less than 1/20 inch, such as 1/20 inch trilobes, could result in weaker particles which easily crumble or fracture and thereby contribute to pressure drop and plugging problems in the reactor. Despite these concerns, however, smaller catalytically active particles are desirable as a way of controlling and minimizing the diffusion effect attributable to larger particles.

SUMMARY OF THE INVENTION

Figure 1:
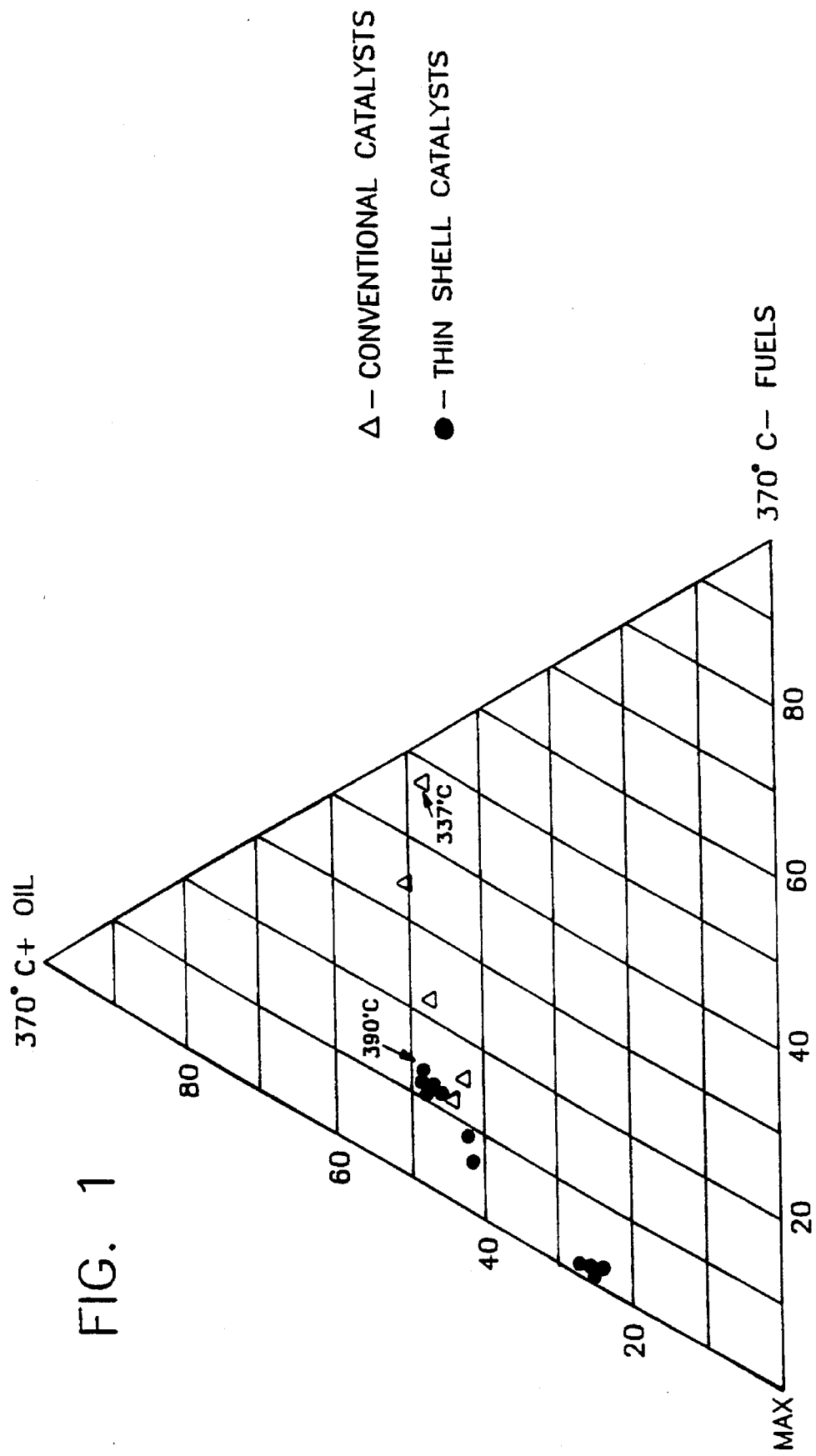
FIG. 1 compares the activity-selectivity of the thin shell catalyst and a conventional hydroisomerization catalyst of comparable platinum and fluorine content for wax isomerization at constant space velocity.

A catalyst is disclosed comprising a thin annular shell of catalytically active material deposited on and bonded to a core of catalytically inert material. The catalytically inert core material none the less has surface sites capable of chemical reaction at the interface with the boehmite/pseudo boehmite component of the thin annular shell of catalytically active material thereby bonding the thin shell to the inert core.

The catalyst can be made by mixing finely divided catalytically active material or finely divided preformed catalyst with colloidal boehmite/pseudo boehmite in solvent to produce a slurry which is then coated onto an inert core particle of, for example, alpha alumina. The thin coated particle is calcined to convert the colloidal boehmite/pseudo boehmite into gamma alumina during which process bonds are formed with the inert core resulting in a firmly bound thin shell of suspended finely divided catalytically active material or finely divided preformed catalyst.

Alternatively an inert core can be coated with just a thin coating of colloidal boehmite/pseudo boehmite in solvent and calcined to produce a thin shell of gamma alumina bonded to the inert core. Catalytically active metals and optionally activity enhancers, e.g., Group VIB, VIIB, and VIII metals, oxides and sulfides and mixtures thereof and phosphorous, halogen or boron and mixtures thereof can then be deposited onto the catalyst. The catalytically active metals and activity enhancers which interact only with the gamma alumina are deposited only onto the thin gamma alumina shell producing, a catalyst which behaves like a small particle catalyst.

A catalyst comprising a thin shell of platinum or fluorided alumina deposited on an inert core is useful as a catalyst for the isomerization of waxes and the upgrading of distillates and raffinates.

DESCRIPTION OF THE PREFERRED EMBODIMENTS

The catalyst comprises a thin shell of catalytically active material in gamma alumina bonded to an inert, catalytically inactive core material such as alpha or gamma alumina. The thin shell of catalytically active material may comprise Group VIB, VIIB, VIII catalytically active metals, metal oxide or sulfides and mixtures thereof and optionally including activators such as phosphorous, halogen or boron or such Group VIB, VIIB, VIII catalytically active metals, metal oxides or metal sulfides and optionally including activators such as phosphorus, halogen or boron and mixtures thereof deposited on a refractory metal oxide base such as alumina, silica, silica/alumina, titania, zirconia, etc. and mixtures thereof, and aluminasilicate such as natural or synthetic zeolites such as zeolite X, zeolite Y, zeolite B, ZSM-5, offretite, mordenite, erronite, etc. and mixtures thereof. The thin shell comprises a mixture of the aforesaid catalytically active material dispersed in gamma alumina. The thin shell of catalytically active material dispersed in gamma alumina is bonded to an inert core material such as alpha or gamma alumina.

The catalyst can be made by dispersing finely divided catalytically active material such as Group VIB, VIIB or VIII metals oxides or sulfides and mixtures thereof, preferably Group VIII metal, most preferably platinum and palladium, and any desired activator such as phosphorous, chlorine, fluorine, bromine or boron and mixtures thereof, preferably fluorine, in pseudo boehmite or by dispersing finely divided preformed catalyst such as Group VIB, VIIB or VIII metal oxide or sulfide and mixtures thereof on refractory inorganic metal oxide support such as alumina, silica, silica/alumina, zirconia, titania and mixtures thereof and alumina-silicates such as natural or synthetic zeolite and optionally containing activators such as phosphorous, halogen or boron and mixtures thereof, preferably a preformed Pt or Pd on fluorided gamma alumina, mixed with colloidal boehmite/pseudo boehmite in solvent to produce a slurry that is coated onto an inert, catalytically inactive core such as alpha alumina or gamma alumina then calcined to convert the boehmite/pseudo boehmite component of the coating into gamma alumina. Conversion of boehmite/pseudo boehmite into gamma alumina effectively binds the thin shell containing the finely divided catalytically active material or finely divided preformed catalyst, to the inert core of, e.g., alpha or gamma alumina.

The thin active shell may contain any desired amount of catalytically active material taking into account that a sufficient amount of boehmite/pseudo boehmite must be available for conversion into gamma alumina to generate the bonding matrix.

Because the catalytically active material is present only in the thin shell and not throughout the entire particle, less catalytically active material is needed, based on the total weight of catalyst, versus conventional catalysts with a uniform distribution of active component throughout the particle.

The finely divided catalytically active material is mixed with the colloidal boehmite/pseudo boehmite slurry (which itself typically contains only 20% by weight boehmite/pseudo boehmite) in a ratio sufficient to subsequently produce the desired percentage of the active components in the gamma alumina coating. For example, to produce a 1% platinum loading in the outer gamma alumina layer of the finished catalyst would require a mixing ratio of about 1:250 of platinum salt to slurry (by weight)(i.e., 1:500 platinum metal to slurry by weight).

Alternatively, when using finely divided preformed catalyst as the catalytically active material (rather than the individual components for the catalyst), it may be mixed with the colloidal boehmite/pseudo boehmite slurry (20% in solvent) in a ratio of about 1:1 to 1:4 by weight, preferably 1:2 finely divided performed catalyst to boehmite/pseudo boehmite ratio, which when calcined results in finely divided preformed catalyst to gamma alumina ratios of the same range.

In general it is preferred that the final catalyst have from 0.1 to 5% by weight catalytically active metal and, from 0 to 15% by weight promoter in the outer layer, preferably 0.3 to 2 wt% catalytically active metal and 0.1 to 2 wt% promoter.

The thin layer of boehmite/pseudo boehmitecatalytically active material, and, following calcination the resulting thin layer of catalytically active material in gamma alumina, may range from 10 to 500 microns in thickness, preferably 20 to 200 microns in thickness, the thinner shell being preferred for those processes in which diffusion effects of feed/product into the catalyst are detrimental.

The colloidal boehmite/pseudo boehmite is produced by mixing boehmite/pseudo boehmite with a solvent such as water, ketone, alcohol, ether, etc, preferably water. The boehmite/pseudo boehmite is present in the solvent at a level of 1 to 30% preferably 10 to 20% boehmite in solvent producing colloidal boehmite/pseudo boehmite.

When the object is to produce an acid catalyst, such as a catalyst useful for wax isomerization or waxy hydrocarbon upgrading it is necessary that the colloidal boehmite/pseudo boehmite slurry have no basicity attributable to strong bases such as those containing alkaline or alkaline earth cations. Basicity attributable to bases having volatile cations such as ammonium cation can be tolerated because such volatile cation components can be easily driven off during the calcination step which converts the boehmite/pseudo boehmite into gamma alumina and such bases do not have a negative impact on the acidity of the catalyst. In general it is preferred that in producing an acidic catalyst the colloidal boehmite/pseudo boehmite slurry be neutral or acidic (pH 7 or less).

The inert core particles are coated with the slurry by any convenient method such as rolling, milling, dipping, spraying, etc. the object being to produce a thin, even coating.

The coated particles are dried and calcined. Calcination is conducted under conditions sufficient to convert the boehmite/pseudo boehmite into gamma alumina. Such conditions can include heating the coated particles in air at 500° to 600° C. for from 1 to 24 hours.

Calcination converts the boehmite/pseudo boehmite into a gamma alumina bonding matrix in which is suspended the catalytically active material, which chemically bonds to the inert core producing a strong, physically stable particle.

If the inert particle core is coated with just a layer of colloidal boehmite/pseudo boehmite, calcination will generate a gamma alumina shell bonded to the the inert core. This shell may then be loaded with catalytically active material such as Group VIB, VIIB or VIII metals, oxide or sulfide, and mixtures thereof and any desired activator such as phosphorous, halogen or boron. The amount of such materials loaded onto the shell is left to the discretion of the practitioner.

When producing isomerization catalyst by the above technique, if one starts with a preformed isomerization catalyst such as platinum on fluorided alumina, it is preferred that the amounts of platinum and fluorine in the preformed catalyst be such that after mixing with the colloidal boehmite/pseudo boehmite slurry and taking the dilution effect into consideration the amount of platinum and fluorine in the outer shell of the finished catalyst is in the range of 0.1 to 2.0% platinum and 0.1 to 10.0% fluorine.

When used for isomerization, the catalyst is usually activated prior to use by heating in a hydrogen atmosphere (e.g., pure or plant hydrogen (i.e., ~60 to 70 vol% $H_2$)) to from 350° C. to 500° C. for from 1 to 48 hours or longer.

A typical hydrogen activation profile may be a period of 2 hours to go from room temperature to 100° C. with the catalyst being held at 100° from 0 to 2 hours, then the temperature is raised from 100° C. to about 350° C. to 500° C., preferably 350° C. to 450° C. over a period of 1 to 50 hours with a hold at the final temperature of from 0 to 24 hours, (preferably 24 hours). Similarly, hydrogen activation can be accomplished by going from room temperature to the final temperature of 350° C. to 500° C. preferably 350° C. to 450° C. in 1 to 50 hours.

The catalysts of the present invention are useful for isomerizing wax to liquid products and for upgrading waxy distillates and raffinates. The wax which is isomerized can be any natural petroleum wax identified as slack wax, recovered by the solvent dewaxing of petroleum hydrocarbon feeds, or synthetic wax such as that obtained by the Fischer-Tropsch process.

Natural waxes such as the aforementioned slack wax can contain appreciable amount of oil. It is desirable to deoil the slack wax before the isomerization process. Slack waxes containing anywhere between 0 to 50% oil can be isomerized, although the more desirable oil content is about 35% oil and less. Natural waxes also can contain heteroatom compounds, that is compounds containing nitrogen and sulfur. Such heteroatom compounds are known to deactivate noble metal containing isomerization catalyst. Before isomerizing such heteroatom containing wax feeds, it is necessary to reduce the sulfur and nitrogen content of the feed. These heteroatom containing wax feeds should be hydrotreated to reduce the level of heteroatom compounds to levels commonly accepted in the industry as tolerable for feeds to be exposed to isomerization catalysts. Such levels will typically be a nitrogen content of about 1 to 5 ppm and a sulfur content of about 1 to 20 ppm, preferably 2 ppm or less nitrogen and 5 ppm or less sulfur. The hydrotreating step will employ typical hydrotreating catalysts such as Co/Mo, Ni/Mo, or Ni/Co/Mo on alumina under standard, commercially accepted conditions, e.g., temperature of about 280° C. to 400° C., space velocity of about 0.1 to 2.0 V/V/hr, pressure of from about 500 to 3,000 psig $H_2$ and hydrogen gas rates of from about 500 to 5000 SCF/bbl.

As previously stated, synthetic waxes such as those obtained from Fischer-Tropsch synthesis processes can also be used as the wax feed to the isomerization process. Because such waxes are usually free of sulfur and nitrogen compounds, hydrotreating to remove S and N is not needed. Synthetic waxes, however, may contain other polar or oxygenated components and trace metals which may be removed prior to isomerization to improve product daylight and oxidation stability. The waxes are also very high melting and should be softened somewhat to facilitate handling prior to isomerization. These two goals can be accomplished by treating the synthetic wax with a hydrotreating catalyst and hydrogen to reduce the oxygenate and trace metal levels of the wax and to partially hydrocrack/isomerize the wax to lighter and lower melting point materials. This pretreatment of synthetic Fischer-Tropsch waxes is one aspect of the invention taught in U.S. Pat. No. 4,943,672.

Isomerization over the catalyst is conducted at a temperature of 300° C.–400° C., 500 to 3000 psi $H_2$; 1000–10,000 SCF/bbl, $H_2$, and 0.1–10.0 LHSV, preferably 320° C.–385° C., 1000–1500 psi $H_2$, and 1–2 V/V/hr.

An integrated process to produce lube base stock oils or blending stocks by isomerizing waxes is disclosed in copending application U.S. Ser. No. 522,275, filed May 11, 1990, which is a continuation under 37 CFR 1.60 of U.S. Ser. No. 07/283,664 filed Dec. 13, 1988, which is a continuation-in-part of U.S. Ser. No. 135,150 filed Dec. 18, 1987, in the names of Cody, Achia, Bell, West and Wachter.

The desired conversion of wax to a finished grade lube oil is dictated by two factors: (1) the ability of the dewaxing unit to process the unconverted wax remaining in the isomerate and (2) maximum production of dewaxed oil boiling in the lube oil range, e.g., about 330° C.+, preferably 370° C.+; thus high levels of conversion to non-lube boiling range products are undesirable. Consequently, a balance must be struck between low conversions (favoring lubes production but sending too much residual wax to the dewaxer) and high conversion (sending low levels of wax to the dewaxer but producing fuels at the expense of lubes).

In U.S. Ser. No. 522,275 a process is disclosed of the production of non-conventional lube oil base stocks or blending stocks of very low pour point, pour point of about –21° C. or lower, preferably about –24° C. or lower, said pour points being achieved by conventional dewaxing techniques without resort to deep dewaxing procedures, and very high viscosity index (VI), VI's of about 130, and higher, preferably 135 and higher by the isomerization of waxes over isomerization catalysts in an isomerization unit to a level of conversion such that about 40% and less, preferably 15–35%, most preferably 20–30% unconverted wax remains in the fraction of the isomerate boiling in the lube boiling range sent to the dewaxing unit calculated as (unconverted wax)/(unconverted wax +dewaxed oil)×100. For the purposes of that calculation the amount of unconverted wax in the 370° C.+oil fraction is taken to be the amount of wax removed or recovered from said oil fraction upon dewaxing.

Following isomerization the isomerate is fractionated into a lubes cut and fuels cut, the lubes cut being identified as that fraction boiling in the 330° C.+range, preferably the 370° C.+range or even higher. The lubes fraction is then dewaxed to a pour point of about –21° C. or lower. Dewaxing is accomplished by techniques which permit the recovery of unconverted wax, since in the process of the present invention this unconverted wax is recycled to the isomerization unit. It is preferred that this recycle wax after the removal of the solvent used in the dewaxing operation be recycled to the isomerization reactor. A separate stripper can be used to remove entrained dewaxing solvent or other contaminants.

Solvent dewaxing utilizes typical dewaxing solvents such as $C_3$–$C_6$ ketones (e.g., methyl ethyl ketone, methyl isobutyl ketone and mixtures thereof), $C_6$–$C_{10}$ aromatic hydrocarbons (e.g., toluene) mixtures of ketones and aromatics (e.g., MEK/toluene), autorefrigerative solvents such as liquified, normally gaseous $C_2$–$C_4$ hydrocarbons such as propane, propylene, butane, butylene, etc., at filter temperature of –25° C. to –30° C. It has been discovered that the preferred solvent to dewax the isomerate under miscible conditions and thereby produce the highest yield of dewaxed oil at a high filter rate is a mixture of MEK/MIBK (20/80 V/V) used at a temperature in the range of –25° C. to –30° C. Pour points lower than –21° C. can be achieved using lower filter temperatures and other ratios of said solvent. Further, when dewaxing isomerate made from a microwax, e.g., Bright Stock slack wax, it has been found to be preferred that the fraction of the isomerate which is dewaxed is the "broad heart cut" identified as the fraction boiling between about 330° C. to 600° C., preferably 370° C–600° C. When processing wax fractions higher than 1050° F.+the heavy bottoms fraction contains appreciable unconverted wax so they can be recycled to the hydrotreating unit.

It has also been found that prior to fractionation of the isomerate into various cuts and dewaxing said cuts, the total liquid product (TLP) from the isomerization unit can be advantageously treated in a second stage at mild conditions using the isomerization catalyst or a noble Group VIII on refractory metal oxide catalyst to reduce PNA and other contaminants in the isomerate and thus yield an oil of improved daylight stability. This aspect is covered in copending application. U.S. Ser. No. 07/283,659, filed Dec. 13, 1988, which is a continuation-in-part of U.S. Ser. No. 135,149, filed Dec. 18, 1987, in the names of Cody, MacDonald, Eadie and Hamner.

In that embodiment, the total liquid product is passed over a charge of the isomerization catalyst or over noble Group VIII on, e.g., gamma alumina catalyst under mild conditions, e.g., a temperature in the range of about 170° C.–270° C., preferably about 180° C. to 220° C. at a pressure of about 300–1500 psi $H_2$, preferably about 500 to 1000 psi $H_2$, a hydrogen gas rate of about 500 to 10,000 SCF/bbl, preferably 1000 to 5000 SCF/bbl and a flow velocity of about 0.25 to 10 V/V/hr, preferably about 1–4 V/V/hr.

The total liquid product can be treated under these mild conditions in a separate, dedicated unit or the TLP from the isomerization reactor can be stored in tankage and subsequently passed through the isomerization reactor under said mild conditions. It has been found to be unnecessary to fractionate the total liquid product prior to this mild second stage treatment. Subjecting the whole TLP to this mild second stage treatment produces an oil product which upon subsequent fractionation and dewaxing yields a base oil exhibiting a high level of daylight stability and oxidation stability.

EXAMPLES 110 cc of 1/16 inch gamma alumina extrudate were air calcined at 1050° C. for 3 hours to convert them into catalytically inert alpha alumina extrudates as confirmed by x-ray powder diffraction.

22 grams of preformed active catalysts comprising 0.3% Pt 1.0%F on 1/20 inch gamma alumina trilobes made as disclosed in U.S. Pat. No. 4,906,601 was ground into a fine powder and slurried with a two fold excess (44 grams) of NYACOL COLLOIDAL ALUMINA SOL (20% Boehmite in $H_2O$). The resulting gray slurry was transferred to teflon sheet and alpha alumina extrudates were rolled through the slurry to yield thin and evenly coated particles. Periodically, the remaining slurry was diluted with deionized water to maintain a workable slurry consistency. Coated particles were dried at room temperature then air calcined at 550° C. for 3 hours to convert the boehmite into gamma alumina thereby binding the coating to the alpha alumina core particle.

Small scale experiments were performed to determine the fraction of active catalyst.

The calcined thin shell catalyst weighed 17.64 grams following treatment of the alpha alumina core particle which weighed 10.37 grams. Thus the thin shell coating weighed 7.27 grams constituting 41.2% of the total catalyst. This thin shell was made up of finely divided preformed catalyst in gamma alumina (from the conversion of boehmite into gamma alumina). Insofar as 22 grams of preformed catalyst was slurried in 44 grams of a 20% colloidal boehmite solution (8.8 g boehmite), the total dry weight of coating is 30.8 grams. The total amount of active preformed catalyst in the total coating slurry is 71.4%. The final amount of active catalyst in the finished catalyst, therefor, constituted 41.2% of 71.4% or 29.4 wt.% of the finished catalyst (Catalyst A). The finished thin shell catalyst contained 0.24% platinum and 0.8% fluorine in the gamma alumina layer which on the basis of the total weight of catalyst represents 0.07 wt.% platinum and only 0.24 wt.% fluorine.

Catalyst A comprised an alpha alumina core with a radius of 0.8 mm as determined by scanning electron microscopy. It was determined that the average coating thickness was 0.25 mm based on optical microscopy and from the weight increase.

80 cc of the thin shell catalyst were charged to a lab hydrofining unit run in an upflow isothermal mode at 1000 psig pure $H_2$ pressure, 2500 SCF/bbl, 1.0 to 0.5 LHSV and a temperature range of 350 to 390° C.

Another run conducted on a 100 cc charge of 0.3% Pt on 0.75% fluoride 1/16 inch alumina extrudate (fluorided using $NH_4F$)(Catalyst B) in a lab hydro-processing unit was employed as a basis for comparison of the performance of the present catalyst. Both runs were conducted on hydrofinished 600N slack wax with ~20.5 wt% oil content as feed. This comparison run was conducted at a pressure of 1000 psi $H_2$, 1.0 LHSV, gas rate of 5000 SCF/bbl and a temperature of 308 to 337° C.

Both runs were conducted under temperature conditions selected so as to obtain maximum yield of dewaxed oil using the particular catalyst being used.

The results are presented in Table 1.

TABLE 1

COMPARISON OF NEW AND CONVENTIONAL HYDROISOMERIZATION CATALYSTS
(Feed: Hydrofined 600 N Slack Wax, 1000 psig, Upflow)

| Operating Unit Catalyst | A | | | | | B | | | |
|---|---|---|---|---|---|---|---|---|---|
| Temperature | 350 | 380 | 380 | 385 | 390 | 311 | 321 | 331 | 337 |
| Gas treat rate $SCFH_2$/bbl | 2500 | 2500 | 2500 | 2500 | 2500 | 5000 | 5000 | 5000 | 5000 |
| LHSV, v/v/H | 1.0 | 1.0 | 0.5 | 1.0 | 1.0 | 1.0 | 1.0 | 1.0 | 1.0 |
| Conv. to 370° C. on FD | 1.8 | 9.5 | 15.2 | 12.6 | 14.0 | 14.7 | 21.9 | 34.4 | 47.9 |
| Oil Content of 370° C.+ | 28.6 | 41.8 | 69.4 | 56.7 | 58.7 | 50.5 | 60.4 | 75.5 | 79.8 |
| DWO Yield on Feed | 28.1 | 47.8 | 57.9 | 48.0 | 48.3 | 43.0 | 47.1 | 49.5 | 41.5 |

The performance of catalyst A is excellent even though the effective catalyst was only 29.4% by weight of the conventional catalyst charge in terms of platinum and fluoride, i.e. (0.07 wt% Pt and 0.24 wt% F) vs (0.3% Pt, 0.75 wt% F) in catalyst B.

The object in this hydroisomerization process is to maximize the conversion of wax molecules to isomerate oil while minimizing conversion to lower boiling species (e.g., to 370° C.–). Catalyst A shows an about 8 wt% dewaxed oil yield advantage. While it required more severe conditions to attain this (0.5 LHSV and 380° C.) this was accomplished with 70% less catalyst. Therefore, where space velocity or throughput is not critical, this would be a more selective inexpensive alternative.

FIGS. 1 and 2 again clearly illustrate the advantage. FIG. 1, shows activity and selectivity relationship for catalyst A or catalyst B at one space velocity. While it is seen that even at a reactor temperature of 390° C. vs 337° C., the DWO yield of the conventional catalyst could not be exceeded. Catalyst A is much more selective (~13 wt% Fuels vs ~47 wt% Fuels).

Figure 2:
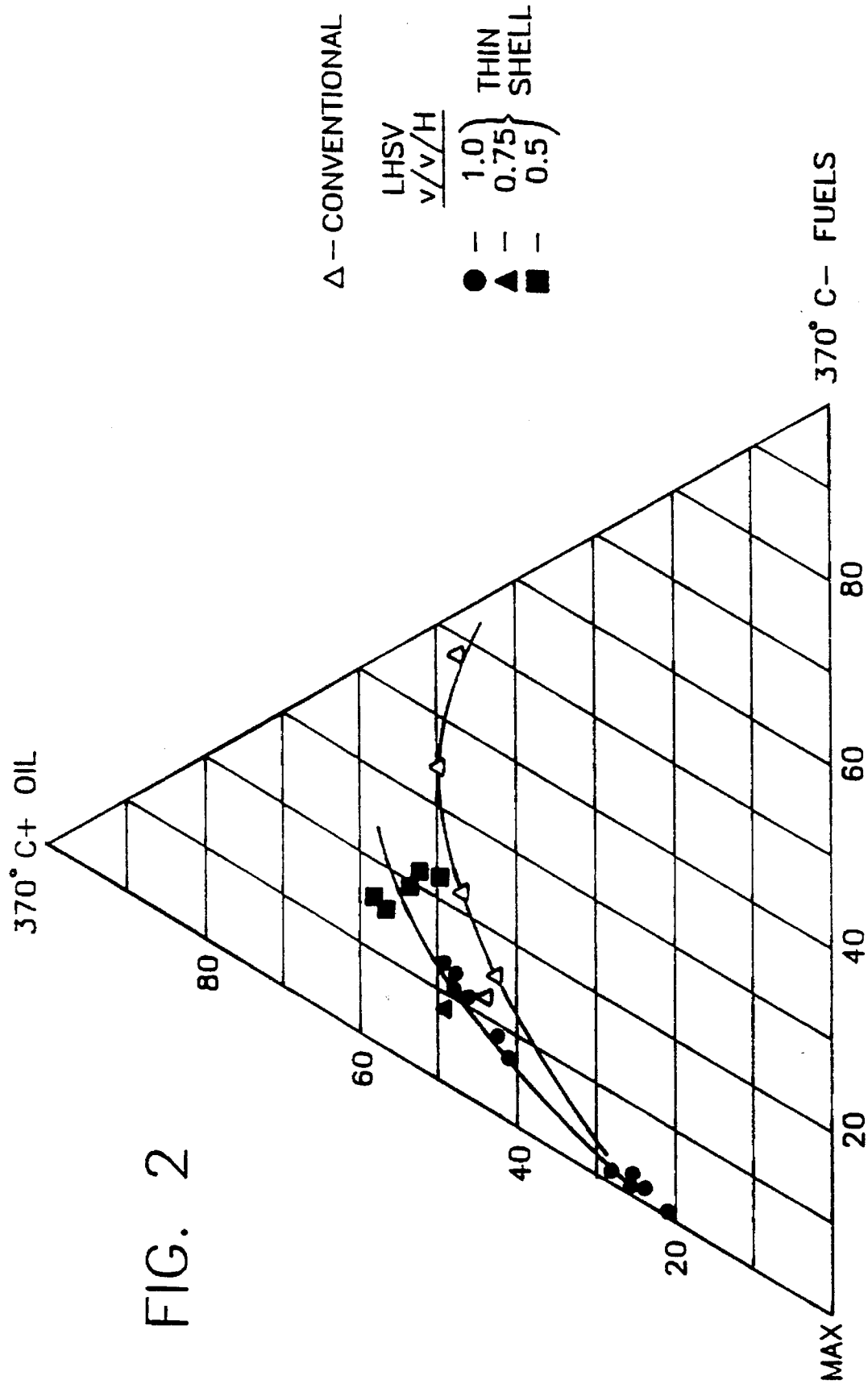
FIG. 2 compares the activity and selectivity for wax isomerate of a thin active shell inert core catalyst with a traditional uniform particle catalyst of comparable platinum and fluoride loading at three different space velocities.

In FIG. 2, the space velocity is reduced to 0.75 and 0.5. At a space velocity of 0.5, catalyst A shows about an 8% DWO yield increase over the optimum of the conventional catalyst but at only ~15% vs ~35% conversion to fuels. Here again, where throughput is not critical, the new thin shell catalyst exceeds the conventional one in terms of selectivity.

We claim:

1. A catalyst comprising a thin annular shell of catalytically active material in gamma alumina wherein the thin annular shell of catalytically active material comprises finely divided preformed catalyst comprising a Group VIB, VIIB or VIII metal, oxide or sulfide and mixtures thereof on refractory metal oxide and further comprising an activator selected from phosphorus, halogen or boron deposited on and bonded to an inert, non-catalytically active core, said inert, non-catalytically active core comprising a material having surface active sites capable of chemical reaction.

2. The catalyst of claim 1 wherein the finely divided preformed catalyst comprises platinum or palladium on fluorided gamma alumina.

3. The catalyst of claim 1 or 2 wherein the non-catalytically active inert core material is alpha alumina.

4. The catalyst of claim 1 wherein the thin annular shell is 10 to 500 microns thick.

5. The catalyst of claim 1 wherein the thin annular shell is 20 to 200 microns thick.

6. A method for producing a catalyst comprising a thin annular shell of catalytically active material in gamma alumina deposited on and bonded to an inert, non-catalytically active core having surface sites capable of chemical reaction, which method comprises dispersing finely divided preformed catalytically active material comprising Group VIB, VIIB, VIII metal, oxide or sulfide and mixtures thereof on a refractory metal oxide support and further containing an activator selected from phosphorus, halogen, boran and mixtures thereof, into colloidal boehmite/pseudo boehmite to produce a slurry, coating an inert catalytically inactive core having surface sites capable of chemical reaction with a thin coating of the colloidal boehmite/pseudo boehmite slurry and calcining the coated core to convert the boehmite/pseudo boehmite into gamma alumina thereby forming a bond between the thin annular shell of preformed catalytically active material in gamma alumina and the inert, non-catalytically active core.

7. The method of claim 6 wherein the inert non-catalytically active core is alpha alumina.

8. The method of claim 7 wherein the thin annular layer of catalytically active material on gamma alumina ranges from 10 to 500 microns in thickness.

9. The method of claim 7 wherein the calcining comprises heating the coated particle in air at 500° to 600° C. for from 1 to 24 hours.

* * * * *